Patented May 10, 1938

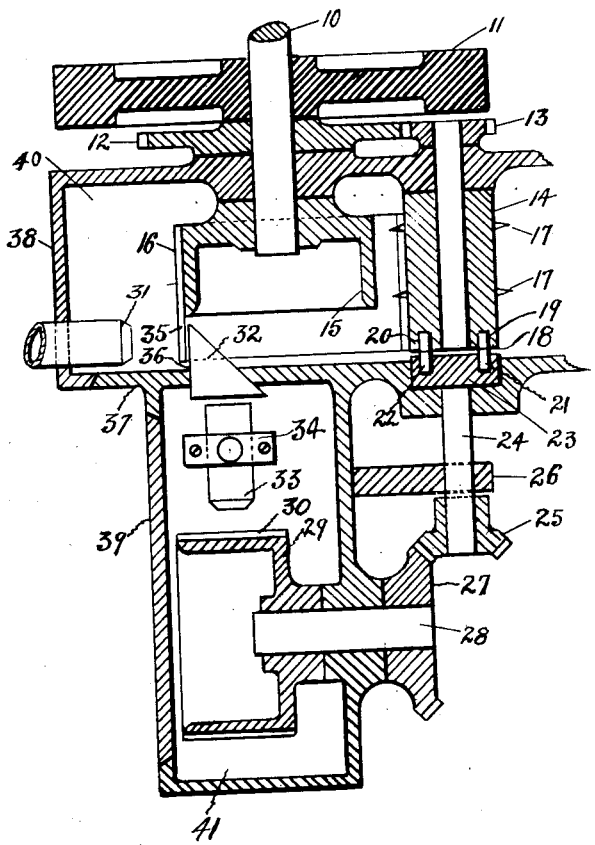

2,117,145

UNITED STATES PATENT OFFICE 2,117,145

FILM-PHONOGRAPH FOR REDUCING A SOUND TRACK AND REPHOTOGRAPHING THE REDUCED TRACK ONTO A NARROW INDEPENDENT FILM REMOTE FROM THE MASTER FILM

Don Canady, Cleveland, Ohio

Application April 22, 1937, Serial No. 138,462

2 Claims. (Cl. 88—24)

It is an object of the present invention to provide a satisfactory apparatus for reducing a sound track of an arbitrary standard on a master film, to a reduced standard on a second film, through the instrumentalities of a system of optical magnifications and a refracting media limited by plane surfaces which are inclined at an angle used in connection therewith.

Briefly stated, the present invention comprises an illuminating system which consists of a light source, such as a bulb, (not shown but understood in the art), a condensing lens system, serving to focus the records of sound on a master sound film strip, remote from the master strip, in reduced imagery. A glass wedge or right isosceles achromatic reflecting prism is wholly or in part behind that part of the film involved in recording the sound waves photographically. The images from the master strip are propagated through the medium of the optical system, and the response indication are propagated, reimaged and reduced, so that they may be recorded on the second film strip photographically, conforming to the reduced response indications.

The invention and its aims and objects will be clearly understood from the following description, taken in connection with the accompanying drawing, of one embodiment of the invention herein given for illustrative purposes, the true scope of the invention being more fully pointed out in the appended claims.

In the drawing Figure 1 is a longitudinal sectional view of the apparatus.

Referring to the figure, 10 represents the main shaft of the apparatus, which may be actuated by a motor, (not shown but understood in the art), 11 is the fly wheel thereof.

12 and 13 are spur gears of chosen ratios, simultaneously meshing to control the film sprocket 14. On the shaft 10 there is provided a recording drum 15 for the master film strip 16. The wrap of the film strip passes over the film sprocket and the recording drum in the conventional manner.

The film sprocket is provided with sprocket teeth 17 adapted to engage in the spaced perforations in the film strip. The various pressure rollers that are used in the standard apparatus are not shown, (but are understood in the art).

The end of the film sprocket 18 is provided with diametrically or other suitably placed bores 19 and 20, adapted to receive the pins or dowels 21 and 22 that fit with fidelity therein. The pins or dowels are fast in the member 23 on the end of the shaft 24. This construction provides a coupling means between the film sprocket 14 and the shaft 24. On the shaft 24 there is provided a fixed bevel gear 25. The shaft is supported by a suitable bracket 26 in which a portion of the shaft is journalled. The bevel gear 25 meshes with the bevel gear 27 fast on the shaft 28 that carries the scanning drum 29 that is provided to accommodate the secondary film 30 on which the image from the master film is reimaged through the optical system.

By suitable choosing the ratios of the various gear wheels, the recording drum of the master film and the scanning drum of the secondary film strip are brought into synchronization, with the result that the responsive indications are synchronized thereby.

The optical system comprises a suitable light source, (not shown but understood in the art); the light source is projected in a narrow line or streak by means of a lens 31 on the surface of the master film. The light passes through the film to the right isosceles prism 32, thence to the condensing lens system 33 then to the secondary film strip 30 where it is reimaged in reduced size and photographically recorded. The condensing lens system is supported adjustably in a suitable bracket as at 34.

The film strip overhangs the recording drum as shown at 35, to allow the prism to be properly placed in relation thereto. The face 36 of the prism may be covered with an opaque material such as gold or silver leaf, or with any other surface coating, metallic or otherwise, having therein directionally aligned, a narrow aperture adapted to limit the area of exposure equal to the light band impressed upon the master film by the light source.

The film magazines are not shown, being conventional in the art. The secondary recording means 37 is hinged, or otherwise secured to the master recording means 38. The secondary recording means is provided with a suitable closure or door 39. The compartments 40 and 41 may be entered by opening or removing the recording means 37 and the door 39 respectively.

The apparatus may be readily converted into a film phonograph by simply removing the closure carrying the optical reducing system and replacing it with a closure having a photo-cell mounted therein to reproduce the sound from the master film.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description, to indicate the scope of the invention.

What I claim as new and desire to secure by Letters Patent of the United States is:

1. In an apparatus of the class described comprising in combination, an optical system for translating sound vibrations to a film strip by the use of light varied in accordance with sound waves, a recording drum, a film sprocket, a master film strip, the aforesaid film strip passing over the recording drum and sprocket in arcual contact, the film sprocket being provided with bores at an end thereof in a direction parallel with the axis of the sprocket, coupling pins, the bores and pins providing a clutch member intermediate the sprocket and a driven shaft, a toothed wheel fast on the driven shaft and meshing with a toothed wheel fast on a shaft having a scanning drum fast thereon, a second film on the scanning drum, means for projecting an image from the master film in reduced size onto the surface of the second film spaced laterally from the master film, and means including a prism forming an angle placed in selected location relative to the film, and a lens system for imaging the image on the master film in reduced size onto the second film.

2. In an apparatus of the class described comprising in combination, an optical system for translating sound vibration to a film strip by the use of light varied in accordance with sound waves, a recording drum, a film sprocket, a master film strip, the aforesaid strip passing over the drum and sprocket in arcual contact, the film sprocket being provided with bores at an end thereof, coupling pins, the coupling pins adapted to provide a clutch with a driven shaft, a driven shaft, the driven shaft being directionally aligned with the axis of the film sprocket, a scanning drum, a second film strip passing over the scanning drum, means for synchronizing the operation of the scanning drum and the second film strip with the recording drum and the master film strip, said means comprising a plurality of gears of various diameters and means for imaging an image from the master film in reduced size onto the second film strip by projecting the image through an optical system positioned rearwardly and laterally of the image to be reimaged on the master film.

DON CANADY.